United States Patent [19]

Peter

[11] Patent Number: 4,547,637
[45] Date of Patent: Oct. 15, 1985

[54] PISTON OPERABLE SWITCH

[75] Inventor: Gunter Peter, Theley, Fed. Rep. of Germany

[73] Assignee: Gesellschaft fur Hydraulik-Zubehor mbH, Fed. Rep. of Germany

[21] Appl. No.: 563,570

[22] Filed: Dec. 20, 1983

[30] Foreign Application Priority Data

Dec. 21, 1982 [DE] Fed. Rep. of Germany ....... 3247210

[51] Int. Cl.$^4$ .............................................. H01H 9/02
[52] U.S. Cl. ................................................. 200/82 R
[58] Field of Search ............ 200/52 R, 61.53, 81.9 R, 200/82 R, 82 C, 82 D, 82 DA, 82 E, 81 R

[56] References Cited

U.S. PATENT DOCUMENTS 3,606,487  9/1971  Kersting .................... 200/82 D X
3,974,350  8/1976  Breed ............................. 200/61.53

FOREIGN PATENT DOCUMENTS 2363238  1/1982  France .
126943   8/1977  German Democratic Rep. .

Primary Examiner—J. R. Scott
Attorney, Agent, or Firm—Roylance, Abrams, Berdo & Goodman

[57] ABSTRACT

A switch operable by a piston which is movable within a piston chamber, comprises a switch housing having a longitudinal bore, a hollow housing member extending from one end of the switch housing into the longitudinal bore, a tubular switch member, and a central pin. The switch member is axially movable in the longitudinal bore between a first position remote from the housing member and a second position adjacent to housing member, and has an inner surface with transverse cross-sectional dimensions greater than those of the housing member outer surface within the longitudinal bore. The central pin is fixed to the switch member, extends within the switch member and is radially spaced from the inner surface of the switch member. A helical switch spring engages and extends between the switch member and the housing member with its first end portion received within the housing member and its opposite second end portion surrounding the pin and received within the switch member. The pin and housing member radially support the spring against bending in radial directions in all positions of the switch member. Switch elements are mounted in the switch housing for sensing the position of the switch member.

9 Claims, 1 Drawing Figure

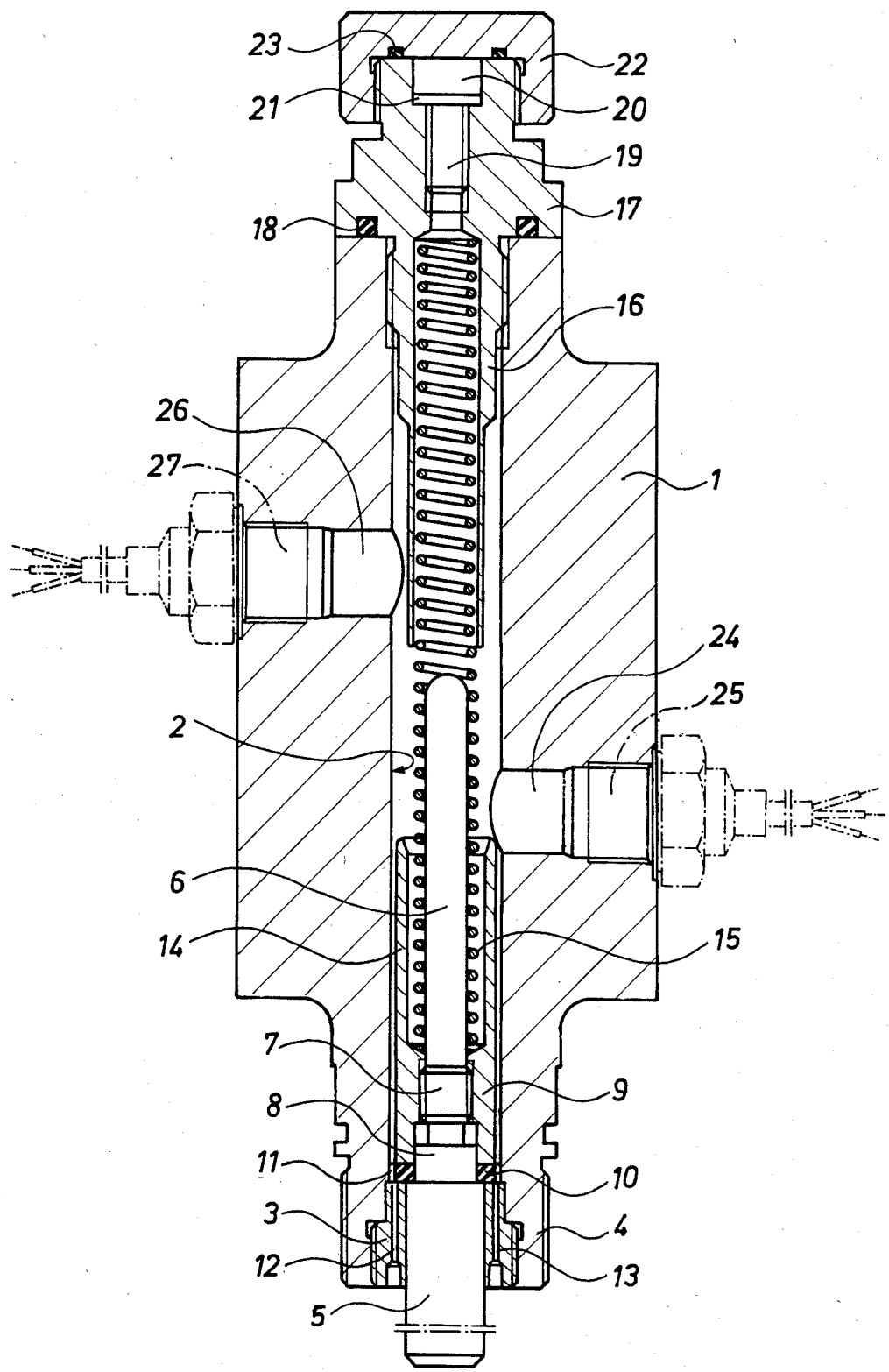

PISTON OPERABLE SWITCH

FIELD OF THE INVENTION

The present invention relates to a switch operable by a piston which is movable within a piston chamber. More particularly, the present invention relates to a switch operable by a piston and having a swtich spring supported in a radial direction against bending in all positions of the switch.

BACKGROUND OF THE INVENTION

A conventional switch operable by a piston which is movable within a piston chamber comprises a switch member in the form of a switch housing and a relatively short switch spring fixed between the front of a counter member and the base of the switch member. A relatively large radial space is provided between the spring and the counter member on the inside of the spring and between the switch member and the spring on the outside of the spring. The counter member has a bearing shoulder interacting with the bearing flange of the switch member and preventing removal of the counter member from the switch member. A typical example of this type of conventional switch is disclosed in the French Pat. No. 2 363238.

A device for monitoring the switch position indicator of a high voltage switching device is also conventional. In such conventional device, the position of an element is indicated. This conventional device has a switch housing in which a switch member is actually slidable, which switch member, in combination with the indicated element, attempts to hold a switch spring in its starting position. Additionally, a switch element can be operated by the switch member following a predetermined path set back from its starting position. A typical example of such device is disclosed in the East German Pat. No. 126,943.

Conventional switches are disadvantageous since their switch springs easily bend and function unreliably as a switch.

SUMMARY OF THE INVENTION

An object of the present invention is to provide a switch operable by a piston which is movable within a piston chamber, which switch will fully support its switch spring in a radial direction to prevent bending in all positions of the switch.

Another object of the present invention is to provide a switch operable by a piston movable in a piston chamber which is reliable.

The foregoing objects are obtained by switch operable by a piston which is movable within a piston chamber, comprising a switch housing having a longitudinal bore, a hollow housing member, a tubular switch member, a central pin and a helical switch spring. The hollow housing member extends from one end of the switch housing into the longitudinal bore and has an outer surface in the longitudinal bore. The tubular switch member is axially movable within the bore between a first position remote from the housing member and a second position adjacent the housing member. The inner surface of the switch member has transverse cross-sectional dimensions greater than the outer surface of the housing member. The central pin is fixedly coupled to the switch member, extends within the switch member and is radially spaced from the switch member inner surface. The spring engages and extends between the switch member and the housing member with a first end portion received within the housing member and an opposite second end portion surrounding the pin and received within the switch member. The pin and housing member radially support the spring against bending in all positions of the switch member. A switch mechanism is mounted in the switch housing for sensing the position of the switch member. A connection permits the switch housing to be coupled to a piston chamber.

By forming the switch of the present invention in this manner, the switch spring is held such that it absolutely can not bend during the operation of the switch. By preventing bending of the switch spring, the reliable switching operation of the switch is ensured.

The switch mechanism can comprise contactless, inductive switch elements which are activable only by a free end of the switch member. Thus, improper connections are essentially avoided since the housing member, switch spring and locking pin have transverse dimensions less than that of the switch member, and thereby, can not actuate the switch mechanism.

The switching member can be coupled to a piston by a switching bar fixedly attached to the switch member and extending outwardly from the switch housing. The switching bar is slidably mounted in an axial direction within a support member connected to the switch housing. A guide ring can be mounted between the switch member and the switching bar. In this manner, the switch member is reliably controlled.

To prevent the buildup of pressure within the switch during operation, the guide ring and the support member can be provided with through passages. Such passages can also permit the filling of the piston chamber supporting the switch.

The switch housing can have a filler mechanism for connecting a filling device to its longitudinal bore. The filler mechanism can be located on an end of the switch housing remote from the switch member and includes a closure arrangement. This filler mechanism facilitates filling of a piston chamber or the like on which the switch is supported.

Other objects, advantages and salient features of the presnet invention will become apparent from the following detailed description, which, taken in conjunction with the annexed drawings, discloses a preferred embodiment of the present invention.

BRIEF DESCRIPTION OF THE DRAWING

The sole drawing FIGURE, which forms a part of this disclosure, is a side elevational view in section of a switch according to the present invention.

DETAILED DESCRIPTION OF THE PREFERRED EMBODIMENT OF THE INVENTION

The drawing illustrates a switch which indicates the end position of a piston movable within a piston chamber. The switch comprises a switch housing 1 having a longitudinal bore 2 with an essentially equal transverse cross-sectional diameter along the entire length of the bore. The lower end of bore 2 is internally threaded for threadedly engaging a support body 3. A shoulder of support body 3 contacts a corresponding shoulder of switch housing 1. The lower portion of switch housing 1 has external threads 4 adjacent support member 3. Threads 4 permit the switch housing to be threaded into a cover of a piston chamber housing. A switching bar 5 extends through support member 3 and projects outwardly from switch housing 1 to contact a piston in the piston chamber. The switching bar extends into switch housing 1 where it is coupled to a central locking pin 6. Locking pin 6 has a relatively small transverse cross-sectional diameter.

Switching bar 5 is shortened in the drawing as indicated by the illustrated break. The switching bar is elongated to permit actuation of switches 25 and 27 when bar 5 is depressed (i.e., moved upwardly as illustrated in the drawing).

Between switching bar 5 and central pin 6 is a thread 7 and a seat 8. Thread 7 and seat 8 have smaller transverse cross-sectional diameters than that of switching bar 5, but larger transverse cross-sectional diameters than that of locking pin 6. Additionally, seat 8 has a larger transverse cross-sectional diameter than that of thread 7.

A switch member 9 rests on and engages seat 8, and is threadedly engaged with thread 7. A guide ring 10 is provided between switching bar 5 and switch member 9. The guide ring is formed of plastic, particularly of polyamide. Guide ring 10 has longitudinal grooves 11 on its periphery. Support member 3 has ventilation bores 12 and 13 extending axially and parallel to each other. Longitudinal bore 2 within switch housing 1 is connected with the interior of a piston chamber through ventilation bores 12 and 13 in support member 3 and through longitudinal grooves 11 on the outer periphery of guide ring 10.

Tubular switch member 9 is configured as a sleeve and surrounds locking pin 6 with its cover portion 14. The inner surface of switch member 9 is radially spaced from pin 6 to permit one end portion of a switch spring 15 to be mounted between pin 6 and switch member 9. The opposite end of switch spring 15 is housed in a hollow housing member 16. Housing member 16 is threaded onto the end of switch housing 1 opposite support member 3. A flange 17 is provided on housing member 16 for engaging switch housing 1. The clearance between flange 17 and switch housing 1 is sealed by a packing ring 18. A closure screw 19 is threaded within housing member flange 17 coaxially relative to longitudinal bore 2. A packing disc 21 is provided between the head 20 of screw 19 and the base of the housing member bore in which the screw is inserted to provide the desired seal. The portion of flange 17 surrounding head 20 is externally threaded for threadedly engaging a cap 22. The clearance between cap 22 and flange 17 is sealed by a packing ring 23.

Housing member 16 is relatively thin, at least at its interior end, and receives switch spring 15 with relatively little lateral play. In this manner, housing member 16 functions as a counter member. Housing member 16 is formed relative to switch member 9 and locking pin 6 such that, when switch member 9 moves upwardly against the bias of switch spring 15, locking pin 6 can be received within the hollow interior of housing member 16 while housing member 16 is received within switch member 9. Relatively little play is provided between locking pin 6 and housing member 16 and between housing member 16 and switch member 9. The little play between the locking pin 6 and housing member 16 is provided by the presence of switch spring 15 therebetween. The little play between switch member 9 and housing member 16 is provided by the outer diameter of housing member 16 being only slightly smaller than the inner diameter of switch member 9.

Adjacent the top or free end of switch member 9, in the position illustrated in the drawing, a transverse bore 24 extends through switch housing 1. Bore 24 houses an inductive proximity switch which operates in a contactless manner and which is threadedly secured within bore 24. A second transverse bore 26, similar to transverse bore 24, is arranged at a predetermined distance from bore 24 on the opposite side of switch housing 1. Bore 26 corresponds to the end point of the movement path of switch member 9 and houses a second proximity switch 27 which is similar to proximity switch 25. The two proximity switches are connected to a suitable control which interprets the signals generated by switches 25 and 27 in response to the sensed position of switch member 9.

The configuration of proximity switches 25 and 27, switch member 9, housing member 16, switch spring 15 and locking pin 6 permit only switch member 9 to actuate the proximity switches. Pin 6, spring 15 and housing member 16 are spaced from proximity switches 25 and 27 such that they exert no influence and can not actuate such switches.

The adjacent free ends of locking pin 6 and housing member 16 are relatively close although they are spaced some distance from each other. The spacing is important and is selected so as to prevent any bending of switch spring 15. Regardless of the position of switch member 9, even in the position most remote from housing member 16 illustrated in the drawing, locking pin 6 and housing member 16 laterally support spring 15 fully so as to prevent any bending.

Guide ring 10 moves with switch member 9 upon actuation of switching bar 5. The guide ring, together with support member 3, guide the movement of the locking pin and provide direct radial support therefor.

The piston chamber upon which switch housing 1 is supported can be filled through the switch of the present invention. To accomplish filling, cap 22 is removed and a filling device is mounted on flange 17 of housing member 16. After removal of closing screw 19, the piston chamber can be filled by passing fluid through housing chamber 16, longitudinal bore 2, grooves 11 on the periphery of guide ring 10, and ventilation bores 12 and 13 in support member 3.

While a particular embodiment has been chosen to illustrate the invention, it will be understood by those skilled in the art that various changes and modifications can be made therein without departing from the scope of the invention as defined in the appended claim.

What is claimed is:

1. A switch operable by a piston which is movable within a piston chamber, comprising:

a switch housing having a longitudinal bore extending therethrough;

a hollow housing member extending from one end of said switch housing into said longitudinal bore and having an outer surface in said longitudinal bore;

a tubular switch member axially movable in said longitudinal bore between a first position remote from said housing member and a second position adjacent said housing member, said switch member having an inner surface with transverse cross-sectional dimensions greater than those of said housing member outer surface;

a central pin fixedly coupled to said switch member, said pin extending within said switch member and being radially spaced from said inner surface of said switch member;

a helical spring engaging and extending between said switch member and said housing member, said spring having a first end portion received within said housing member and an opposite second end portion surrounding said pin and received within said switch member, said pin and said housing member radially supporting said spring against bending in all positions of said switch member;

switch means, mounted in said switch housing, for sensing the position of said switch member.

2. A switch according to claim 1 wherein said switch means comprise contactless, inductive switch elements activable only by a free end of said switch member.

3. A switch according to claim 1 wherein a switching bar is fixedly attached to said switch member and extends outwardly from said switch housing, said switching bar being slidably mounted in an axial direction within a support member connected to said switch housing; and a guide ring is mounted between said switch member and said switching bar.

4. A switch according to claim 3 wherein said guide ring and said support member have passages extending therethrough.

5. A switch according to claim 4 wherein said switch housing has filler means for connecting a filling device to said longitudinal bore, said filler means being located on an end on said switch housing remote from said switch member and including means for closing.

6. A switch according to claim 3 wherein said switch housing has filler means for connecting a filling device to said longitudinal bore, said filler means being located on an end on said switch housing remote from said switch member and including means for closing.

7. A switch according to claim 2 wherein said switch housing has filler means for connecting a filling device to said longitudinal bore, said filler means being located on an end on said switch housing remote from said switch member and including means for closing.

8. A switch according to claim 1 wherein said switch housing has filler means for connecting a filling device to said longitudinal bore, said filler means being located on an end on said switch housing remote from said switch member and including means for closing.

9. A switch according to claim 1 wherein said housing member and said central pin comprise free ends located adjacent one another in said longitudinal bore.

* * * * *